(12) United States Patent
Stevens et al.

(10) Patent No.: US 9,486,910 B2
(45) Date of Patent: Nov. 8, 2016

(54) TABLET COMPUTER HOLDER

(71) Applicant: Kaylor Global, Inc., Redwood City, CA (US)

(72) Inventors: Micah Stevens, Redwood City, CA (US); Brett Augood, El Dorado Hills, CA (US)

(73) Assignee: Kaylor Global, Inc., Redwood City, CA (US)

( * ) Notice: Subject to any disclaimer, the term of this patent is extended or adjusted under 35 U.S.C. 154(b) by 0 days.

(21) Appl. No.: 14/257,866

(22) Filed: Apr. 21, 2014

(65) Prior Publication Data

US 2015/0183109 A1 Jul. 2, 2015

Related U.S. Application Data

(60) Provisional application No. 61/921,683, filed on Dec. 30, 2013, provisional application No. 61/931,738, filed on Jan. 27, 2014.

(51) Int. Cl.
*B25G 1/10* (2006.01)
*F16M 11/00* (2006.01)
*G06F 1/16* (2006.01)

(52) U.S. Cl.
CPC ............. *B25G 1/102* (2013.01); *F16M 11/00* (2013.01); *G06F 1/16* (2013.01); *Y10T 16/469* (2015.01)

(58) Field of Classification Search
CPC . Y10T 16/469; Y10T 16/476; Y10S 224/93; H05K 5/0204; A45F 5/00; A45F 2200/0525; G06F 1/1626; G06F 1/163; G06F 1/16; F16M 11/041; F16M 13/04; F16M 13/00; F16M 11/00; A45C 2011/002; A45C 2011/003; B25G 1/102

USPC ........... 16/422, 430; 224/217, 218, 930; 294/25; 455/575.6; 379/679.03; D14/250
See application file for complete search history.

(56) References Cited

U.S. PATENT DOCUMENTS

D376,308 S    12/1996  Lee
5,762,305 A    6/1998  Lee
(Continued)

OTHER PUBLICATIONS

Hold Your Tablet, "About the Bakbone iPad / Tablet Hand Holder Accessory Device," Nov. 18, 2013 [retrieved from Internet on Jul. 23, 2014]. <URL: https://web.archive.org/web/20131118234818/http://www.holdyourtablet.com/pages/about-the-bakbone-tablet-holder>. figures 1-8, paragraphs 1-5.
(Continued)

*Primary Examiner* — William Miller
(74) *Attorney, Agent, or Firm* — Patent Law Professionals, P.C.; William E. Winters (57) ABSTRACT

A holder for holding a tablet computer includes a base with a bottom surface adapted to releasably attach to the back surface of a tablet computer, a top portion, and a body having an aperture formed therethrough and first and second sidewalls having inner surfaces defined in part by the aperture. The first and second sidewalls connect the base to the top portion, and in one embodiment have an outer surface with a concave contour in a plane that is perpendicular to a longitudinal axis of the aperture and which bisects the first and second sidewalls. The aperture has a size and configuration adapted to receive and accommodate one or more fingers of a user's holding hand. With the holder attached to the back surface of the tablet and the user's finger(s) inserted through the aperture of the holder, the user is better able to hold, secure, manipulate and interact with the tablet computer than would be possible without the benefit of the holder.

15 Claims, 4 Drawing Sheets

(56) References Cited

U.S. PATENT DOCUMENTS

| | | | |
|---|---|---|---|
| D471,400 S | | 3/2003 | Jeter et al. |
| D616,285 S | | 5/2010 | Kimber |
| 7,717,483 B1 | | 5/2010 | Bombara |
| D651,205 S | * | 12/2011 | Soekoro .................... D14/250 |
| 8,186,642 B2 | | 5/2012 | Weiss-Vons |
| D674,380 S | * | 1/2013 | Soekoro .................... D14/250 |
| D681,420 S | | 5/2013 | Heuov et al. |
| 8,480,144 B2 | * | 7/2013 | Potter .................... G06F 1/1628 224/217 |
| 8,550,317 B2 | * | 10/2013 | Hyseni .................... 224/197 |
| D693,818 S | | 11/2013 | Webber |
| 8,672,374 B1 | | 3/2014 | Webber |
| D713,140 S | * | 9/2014 | Krupnick .................... D3/218 |
| D716,287 S | * | 10/2014 | Ambriz .................... D14/253 |
| 8,887,970 B2 | * | 11/2014 | Tsai et al. .................... 224/217 |
| D729,787 S | * | 5/2015 | Soekoro .................... D14/250 |
| 9,033,384 B2 | * | 5/2015 | Potter .................... A45F 5/10 294/25 |
| 9,137,915 B2 | * | 9/2015 | McCurdy .................... A45C 13/002 |
| 2009/0270050 A1 | * | 10/2009 | Brown .................... A45F 5/00 455/90.3 |
| 2010/0222118 A1 | * | 9/2010 | Interdanato .................... 455/575.6 |
| 2011/0266316 A1 | * | 11/2011 | Ghalib et al. .................... 224/217 |
| 2011/0284599 A1 | | 11/2011 | Sternick |
| 2012/0031937 A1 | * | 2/2012 | Baker .................... A45C 11/00 224/217 |
| 2012/0326003 A1 | | 12/2012 | Solow et al. |
| 2013/0146625 A1 | * | 6/2013 | Karle et al. .................... 224/217 |
| 2013/0313845 A1 | | 11/2013 | Pedde |
| 2014/0084034 A1 | * | 3/2014 | Wangercyn et al. .................... 224/217 |

OTHER PUBLICATIONS

Hold Your iPad / Tablet Securely With One Hand, http://www.ebay.com/itm/Hold-Your-iPad-Tablet-Securely-With-One-Hand-New-Bakbone Holder Graphite, eBay, Dec. 4, 2013.
2loop iPad Handle, http://www.laptopdesk.net/2llp-ipad-handle.html, laptopdesk, Oct. 15, 2013.
LapWorks Tablet Handler Strapp With Adjustable Strap for All iPads . . . , http://www.amazon.com/LapWorks-Handler-Adjustable-Tablets-including/dp/B008L2N, Oct. 15, 2013.
Hand-e-Holder, http://www.handeholder.com/m5/10000--hand-e-hoider.html, Oct. 15, 2013.
Soft Grip iPad Handle, http:/www.laptopdesk.net/ipad-soft-grip-handle.html, Oct. 15, 2013.
Soft Grip iPad Mini Handle, http://www.laptopdesk.net/ipad-mini-soft-handle-only.html, Oct. 15, 2013.
Soft Grip iPad Mini Handle & Stand, http:/www.laptopdesk.net/ipad-mini-soft-grip-handle.html, Oct. 15, 2013.

* cited by examiner

TABLET COMPUTER HOLDER

CROSS-REFERENCE TO RELATED APPLICATIONS

This application claims the benefit of U.S. Provisional Patent Application No. 61/921,683, filed Dec. 30, 2013, and U.S. Provisional Patent Application No. 61/931,738, filed Jan. 27, 2014.

BACKGROUND OF THE INVENTION

In recent years, tablet computers (sometimes referred to simply as "tablets") have become a popular alternative to conventional desktop and laptop computers. Tablet computers are mobile devices; have a display, microprocessor and battery all integrated in a single unit; and often further include cameras, a microphone, accelerometer, and radio communications devices, such as Wi-Fi, Bluetooth and cellular radios. In addition to the benefit of being mobile, tablet computers can be used in almost any environment, even environments where a table, desktop or other flat surface is not available. Further, rather than requiring a mouse and keyboard, as is usually required with most conventional desktop and laptop computers, a user interacts with a tablet computer via its integrated touchscreen, using simple finger or stylus gestures.

When a tablet computer is being used, the user will often hold it in one hand and interact with the touchscreen of the tablet using their other, free hand. There are two common approaches by which a user will normally hold the tablet. According to a first approach, the user will hold the tablet by gripping one of its edges between the thumb and one or more fingers of their holding hand, for example, along the bordering edge of the touchscreen. Unfortunately, gripping the edge of the tablet in this manner can become uncomfortable or tiresome, especially if performed over an extended period of time. Rather than gripping the edge of the tablet, the user can alternatively hold the tablet by continuously balancing the tablet in their holding hand, for example, with the palm of their holding hand open and facing upward and their fingers spread out. Unfortunately, this approach also has drawbacks. Because the tablet is only being balanced and no other support is provided, when the user interacts with the touchscreen the tablet may have a tendency to shift and/or tilt, making it difficult or cumbersome to interact with and control the tablet. The tablet is also more susceptible to being dropped and damaged when holding only involves balancing the tablet.

Considering the foregoing problems, it would be desirable to have a tablet computer holding apparatus that can facilitate the holding of a tablet computer, that requires only a single holding hand (leaving the other hand free to interact with the tablet's touchscreen), that does not become tiresome to use over extended periods of time, and that allows the user to firmly secure and maintain stability of the tablet computer while the tablet is being interacted with.

BRIEF SUMMARY OF THE INVENTION

Tablet computer holders for facilitating the holding and support of tablet computers are disclosed. An exemplary tablet computer holder comprises a base with a bottom surface adapted to releasably attach to the back surface of a tablet computer, a top portion, and a body having an aperture formed therethrough. First and second sidewalls having inner surfaces, defined in part by the aperture, connect the base to the top portion. In one embodiment of the invention, the first and second sidewalls each have a single smooth outer surface with edges that merge with edges of their respective inner surface.

To use the holder, the user attaches the holder to the back surface of the tablet and inserts a finger (or fingers, depending on the embodiment of the invention) through the holder's aperture (or apertures in embodiments having more than one aperture). Remaining fingers of the user's holding hand can then be fanned out against the back surface of the tablet to further support the tablet. With the holder attached to the back surface of the tablet, the user's finger(s) inserted through the aperture(s), and the remaining un-inserted fingers spread out against the back surface of the tablet, the user is better able to hold, secure, manipulate and interact with the tablet than would be possible without the benefit of the holder. For example, by using the holder, there is no need to attempt to constantly balance the tablet computer. Further, discomfort and fatigue that might otherwise result from gripping the edge of the tablet computer over an extended period of time is avoided.

In one embodiment of the invention, the outer surfaces of the first and second sidewalls have a concave contour in a plane that is perpendicular to a longitudinal axis of the aperture and which bisects the first and second sidewalls. The concavely-contoured outer surfaces serve to provide additional non-slip gripping surfaces for fingers of the user's holding hand that t the user presses against the outside surfaces of the first and second sidewalls.

Further features and advantages of the invention, including descriptions of the structure and operation of the above-summarized and other exemplary embodiments of the invention, will now be described in detail with respect to accompanying drawings, in which like reference numbers are used to indicate identical or functionally similar elements.

DETAILED DESCRIPTION

Figure 1A:
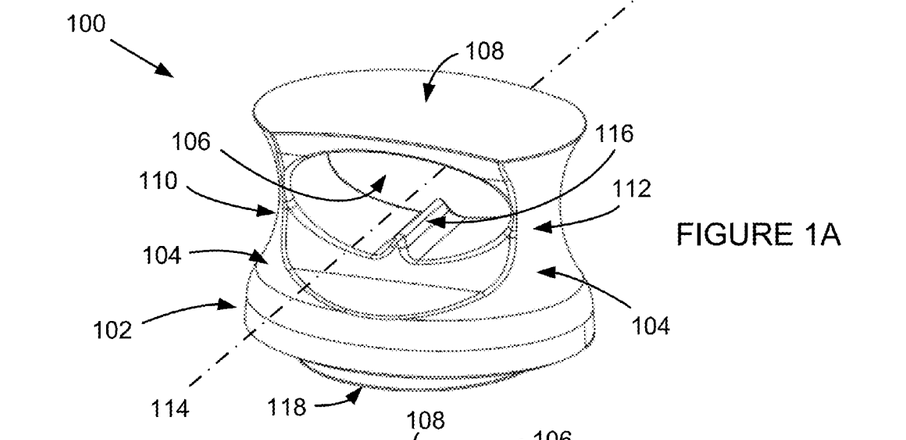
FIG. 1A is a perspective view of a tablet computer holder, according to an embodiment of the present invention.
Figure 1B:
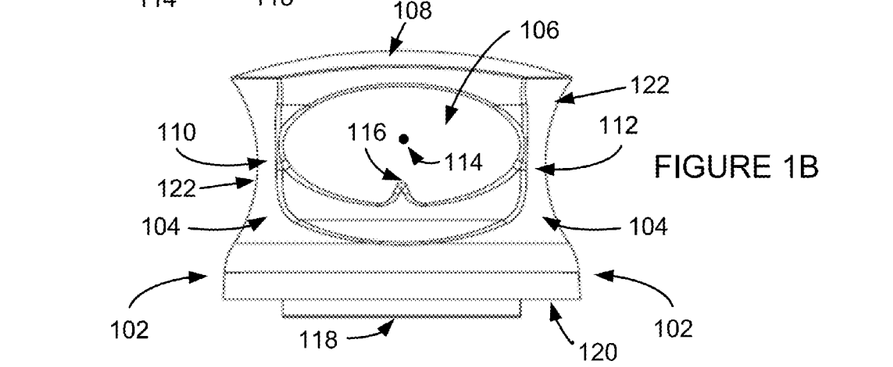
FIG. 1B is front view of the tablet computer holder depicted in FIG. 1A.
Figure 1C:
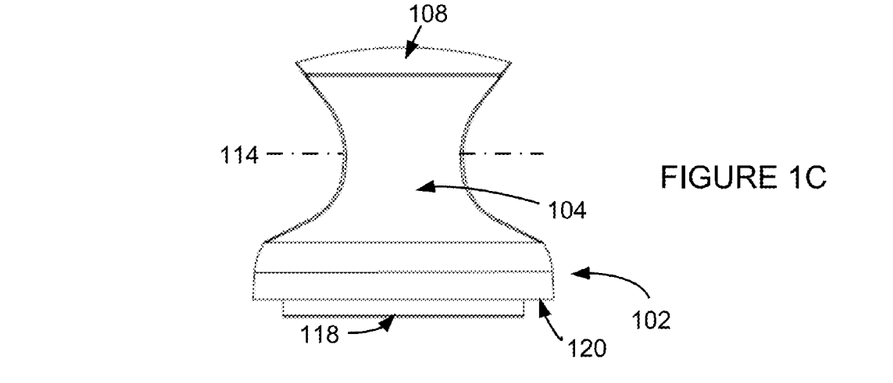
FIG. 1C is a side view of the tablet computer holder depicted in FIGS. 1A and 1B.

Referring to FIG. 1A-C, there is shown perspective, front and side views of a tablet computer holder 100, according to an embodiment of the present invention. The tablet computer holder 100 comprises a solid, hollow or semi-hollow structure having a base 102, a body 104 through which an aperture 106 is formed, a top portion 108, and first and second sidewalls 110 and 112 which comprise part of the body 104 and connect the base 102 to the top portion 108. According to one embodiment of the invention, the first and second sidewalls 110 and 112 each has an inner surface defined in part by the aperture 106 and a single smooth outer surface with edges that merge with edges of the inner surface. According to this and other embodiments of the invention, with the holder 100 positioned so that the bottom surface 120 of its base 102 is oriented in a horizontal plane (as in FIG. 1B, for example), the contour 122 of the outer surface of each of the first and second sidewalls 110 and 112 in a vertical plane that bisects the first and second sidewalls 110 and 112 is generally concave. In various embodiments of the invention, the contours of the outer surfaces of the first and second sidewalls 110 and 112 in planes horizontal to a longitudinal axis 114 of the aperture (for example, a horizontal plane bisecting the first and second sidewalls 110 and 112) are generally convex but may have a different-shaped contour. The aperture 106 extends from front to back along a longitudinal axis 114 and has a cross-section that is elliptical, semi-elliptical (for example, as in the exemplary embodiment depicted in FIG. 1A), or other regular or irregular shape, and has a size sufficient to receive and accommodate two or more fingers of an average-size adult human hand.

The tablet computer holder 100 depicted in FIGS. 1A-C, as well as the other tablet computer holders disclosed herein, may be made of any naturally-occurring or man-made material or a combination of naturally-occurring and man-made materials; may be manufactured according to any suitable manufacturing process; and may have a unibody or multi-member construction. In one embodiment of the invention, for example, a dual-mold injection molding manufacturing process is employed in which a polycarbonate plastic (PC) exoskeleton is formed according to a first injection molding process and a secondary molding process is subsequently performed to form a clear shell made of Polyvinyl Chloride Polymer (PVC) material.

Figure 2:
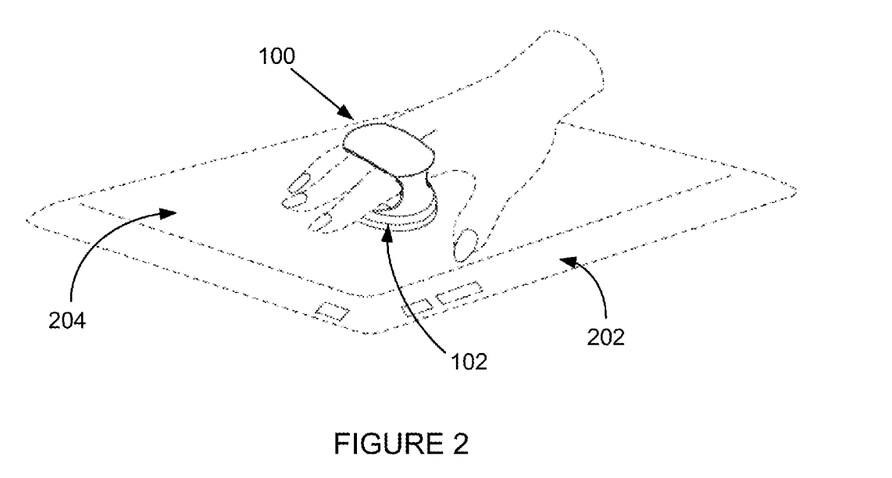
FIG. 2 is a drawing illustrating how the tablet computer holder depicted in FIGS. 1A-C may be attached to the back surface of a tablet computer, and how a user may insert two of their fingers in the aperture of the holder.

The base 102 of the holder 100 is configured to releasably attach to the back surface 204 of a tablet computer 202, as illustrated in FIG. 2. Throughout this disclosure the terms "tablet computer" and "tablet" are used interchangeably. Further, at least for the purpose of this disclosure and the claims, the terms "tablet computer" and "tablet" refer to and mean any electronic device or computer having a tablet-like construction, including tablet computers such as or similar to the Apple iPad, Samsung Galaxy Tab, Microsoft Surface, and tablet e-book and e-reader devices, such as, for example, the Amazon.com Kindle e-reader. A person using the holder 100 (i.e., "user") inserts two fingers of one of their hands (referred to as the "holding hand" in the description that follows) into and through the aperture 106, thereby allowing the user to comfortably hold and support the tablet 202 while viewing and interacting with the tablet's touchscreen using their other, free hand. (It should be noted that in most uses, the holder 100 would be used so that palm of the user's holding hand and the touchscreen side of the tablet 202 are both facing upward, not down, as in FIG. 2, so that the user can view and interact with the tablet's touchscreen. In FIG. 2, the user's holding hand and the touchscreen of the tablet computer 202 are shown as facing down merely for the purpose of illustrating how the holder 100 is attached to the back surface 204 of the tablet 202 and how the user's fingers are inserted through the aperture 106 of the holder 100.)

According to one embodiment of the invention, the body 104 of the tablet computer holder 100 further includes a ridge 116 that protrudes upward into the aperture 106. As best seen by referring to FIGS. 1A and 1B, the ridge 116 is configured so that it extends from the front to the back of the holder 100, in other words, in a direction parallel to the longitudinal axis 114 of the holder 100, and naturally adapts to the crease that forms between the user's two fingers when inserted in the aperture 106. In this manner, the ridge 116 serves to enhance holding security, stability and manipulation capability by providing a more snug fit of the user's fingers and preventing the user's fingers from slipping inside the aperture 106. Avoiding or reducing slipping can be particularly important when the tablet 202 is being carried (for example, when the user is walking while using the holder 100 to hold the tablet 202) and/or when the user is interacting with the tablet's touchscreen 202 or adjusting its physical orientation with respect to the holder 100.

Rather than gripping the holder 100 in the manner illustrated in FIG. 2, the user may alternatively grip the holder 100 by curling two fingers of their holding hand over the top surface 108 of the holder and inserting the ends of the two curled fingers into the aperture 106. For example, the user may curl his or her middle and ring fingers over the top surface 108 and then insert the ends of the curled middle and ring fingers in the aperture 106. When gripping the holder 100 according to this alternative holding approach the user may also (or alternatively) position and press two of their other fingers, e.g., their thumb (or index) and little fingers, against the outside surfaces of the sidewalls 110 and 112, thereby fortifying their grip on the holder 100. In one embodiment of the invention the top surface 108 of the holder 100 is shaped to have a rounded (e.g., convex) surface. The rounded top surface 108 facilitates gripping according to this alternative holding approach and is shaped and sized so that the top surface 108 fits naturally and ergonomically in the palm of the user's holding hand and/or in the curl formed by the user's curled fingers.

Figure 3:
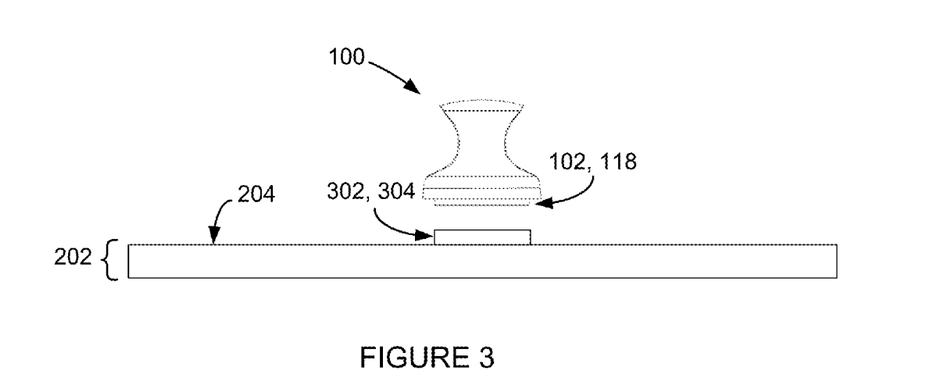
FIG. 3 is drawing illustrating how the tablet computer holder depicted in FIGS. 1A-C releasably attaches to a receiving unit permanently affixed to a back surface of a tablet computer.

Although it is possible to permanently attach the tablet computer holder 100 to the back surface 204 of the tablet 202, it is preferable that it be releasably attached thereto. Consistent with this preference and according to one embodiment of the invention, a separate receiving unit (typically sold together with the holder 100) is permanently or semi-permanently attached to the back surface 204 of the tablet computer 202 (e.g., with use of an adhesive) prior to the holder 100 being used. As shown in FIG. 3, the receiving unit 302 may consist of (or comprise) a first magnet 304 (e.g., a rare-earth permanent magnet) and the base 102 of the holder 100 may consist of (or comprise) a second magnet 118 (which can be embedded in the holder's exoskeleton, for example, if the holder 100 is manufactured according to the dual-mold injection molding manufacturing process mentioned above). The first and second magnets 304 and 118 are configured so that their magnetic fields interact in a manner that causes them to attract one another. Accordingly, when the base 102 of the holder 100 is positioned in close proximity to the receiving unit 302, the attractive force causes the holder 100 to become attached to the receiving unit 302. Once attached, the user can then use the holder 100 to hold and manipulate the tablet 202. To disengage the holder 100 from the receiving unit 302 all the user needs to do is rotate (i.e., roll) their inserted fingers in a peeling away motion.

In another embodiment of the invention, rather than using first and second magnets 304 and 118, a single magnet is used to form one of the receiving unit 302 and base 102 and the other consists of (or comprises) a material that does not comprise a permanent magnet but which is capable of being magnetized (for example, a ferromagnetic or ferrimagnetic material) when positioned within the magnetic field of the magnet used to form the first component. Other attaching approaches can alternatively be used. For example, one or more suction cups can be used, instead of magnets. One advantage of using one or more magnets, however, is that it allows the holder 100 to be rotated with respect to the tablet 202 with little or no other mechanical components, thereby providing a simple but effective means for manipulating the viewing mode of the tablet, for example, to rotate the viewing orientation of the tablet from portrait mode to landscape modes and vice versa. Use of one or more magnets is also advantageous since it allows the user to easily disengage the holder 100 from the receiving unit 302 by simply rotating their fingers in a peeling away motion, as discussed above.

As can be best seen in FIG. 1B, the first and second sidewalls 110 and 112 of the body 104 of the holder 100 have outer surfaces that are concavely contoured in a vertical plane (i.e., the plane perpendicular to the longitudinal axis 114 of the aperture 106) that bisects the first and second sidewalls 110 and 112. The concavely-contoured outer surfaces (see concave contours 122 in FIG. 1B) provide additional gripping surfaces for fingers positioned outside the aperture 106 and along the outer surfaces of the sidewalls 110 and 112. For example, with the middle and ring fingers of the user's holding hand inserted through the aperture 106, the inside surfaces of the user's index and little fingers can be pressed against the concavely-contoured outer surfaces of the sidewalls 110 and 112. Because the outer surfaces are concavely-contoured the index and little fingers are held in place and the possibility of the fingers slipping up and down the outer surfaces of the sidewalls 110 and 112 is significantly reduced, compared to if the outer surfaces had a straight contour, for example. The "four-finger" capability described here enhances stability and control, which is especially important when the user is interacting with the tablet 202 (e.g., when pressing or touching the touchscreen of the tablet to input data or perform a search), transporting the tablet 202 from one location to another, or manipulating the physical orientation of the tablet 202 (e.g., to change the position or viewing angle of the tablet 202).

The tablet computer holder 100 may be constructed to allow the tablet 202 to hinge, pivot and/or rotate about one or more axes. For example, in one embodiment the holder 100 is designed so that the tablet 202 can be rotated 360° about a single axis. The mechanics for providing the hinging, pivoting and/or rotating capability can be included entirely within the holder 100 or can formed as components of both the holder 100 and receiving unit 302. In addition to providing the ability to manipulate and control the orientation of the tablet 202 with respect to the holder 100 while a user holds the tablet 202, the hinging, pivoting and/or rotating capability provides the ability to use the holder 100 as a tablet stand capable of supporting the tablet on a table or desktop.

Figure 4A:
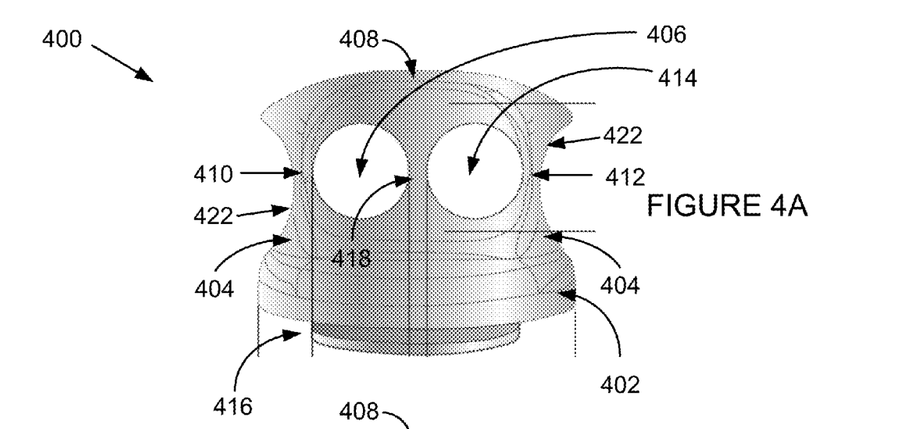
FIG. 4A is a front view of a tablet computer holder, according to an embodiment of the present invention.
Figure 4B:
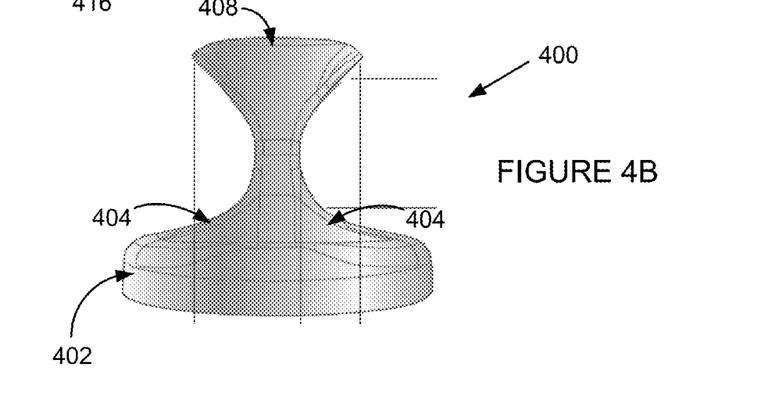
FIG. 4B is a side view of the tablet computer holder depicted in FIG. 4A.
Figure 4C:
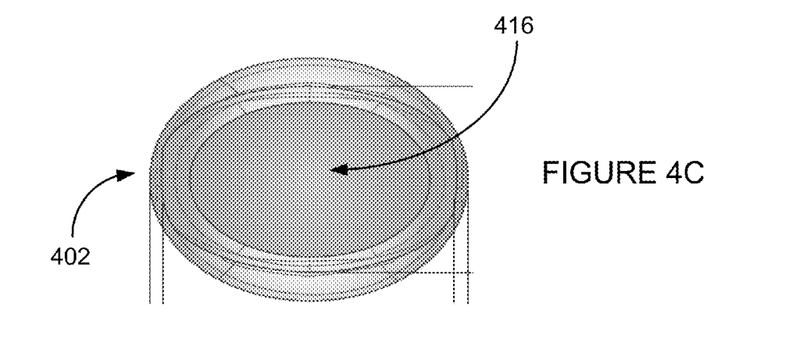
FIG. 4C is a top view of the tablet computer holder depicted in FIGS. 4A and 4B.

FIGS. 4A-C are front, side, and top views of a tablet computer holder 400, according to another embodiment of the present invention. The tablet computer holder 400 is similar to the tablet computer holder 100 depicted in FIGS. 1-3 in various respects. For example, it includes a base 402, a body 404, a top portion 408, and first and second sidewalls 410 and 412 that connect the base 402 to the top portion 408 and have outer surfaces that are concavely contoured (see concave contours 422 in FIG. 4A). The base 402 may also include a magnet 416 for releasably attaching the holder 400 to a receiving unit, similar to illustrated and described in reference to FIGS. 2 and 3. However, rather than having a single aperture 106, the tablet computer holder 400 includes first and second apertures 406 and 414 for receiving two fingers and a middle support column 418 formed between the first and second apertures 406 and 414. The middle support column 418, like the first and second sidewalls 410 and 412, connects the base 402 to the top portion 408. The user can insert whichever two fingers he or she feels most comfortable with using through the first and second apertures 406 and 414. If the middle and ring fingers are used, the index finger (or thumb) and little fingers can be beneficially used to fortify gripping by pressing them against the outer surfaces of the first and second sidewalls 410 and 412, similar as can be done when the user inserts his or her middle and ring fingers through the single aperture 106 of the holder 100 described above in reference to FIGS. 1A-C.

Figure 5A:
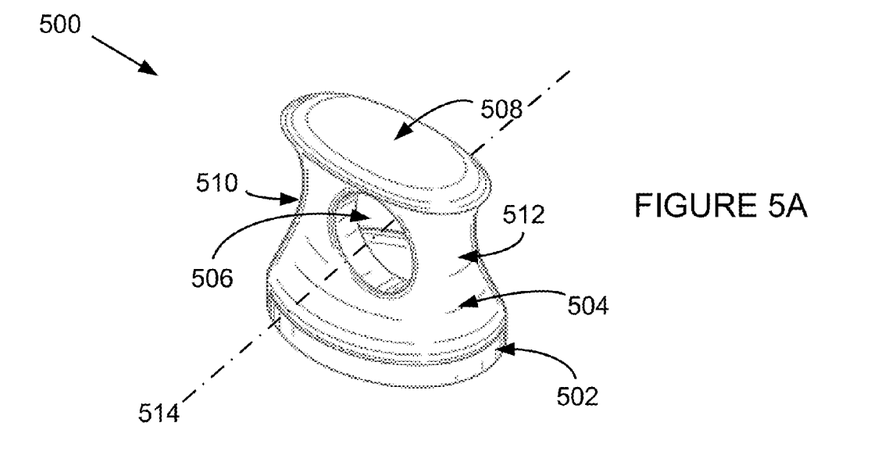
FIG. 5A is a perspective view of a tablet computer holder, according to an embodiment of the present invention.
Figure 5B:
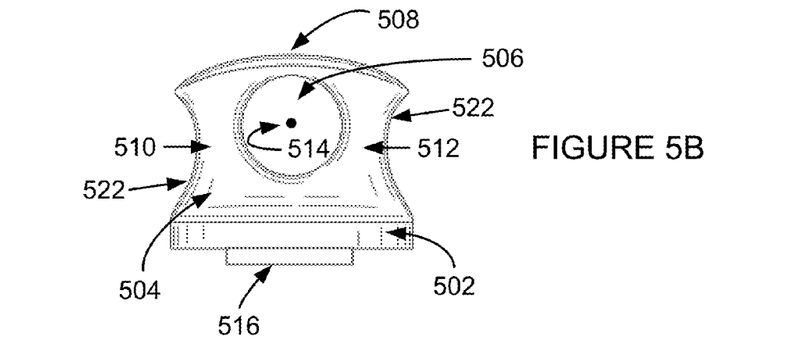
FIG. 5B is front view of the tablet computer holder depicted in FIG. 5A.
Figure 5C:
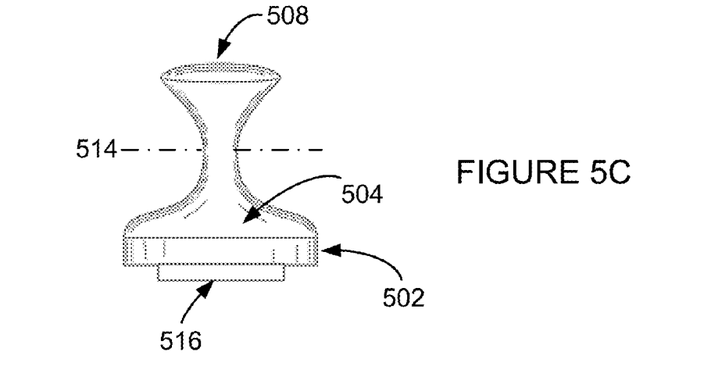
FIG. 5C is a side view of the tablet computer holder depicted in FIGS. 5A and 5B.

FIGS. 5A-C shows perspective, front and side views of a tablet computer holder 500, according to another embodiment of the present invention. The tablet computer holder 500 has a base 502, a body 504 through which a an aperture 506 is formed, and first and second sidewalls 510 and 512 which comprise part of the body 504 and connect the base 502 to the top portion 508. The aperture 506 has a cross-section that is generally circular (although other shapes are possible alternatives) and a size sufficient to receive and accommodate a single finger of an average-size adult human hand. According to one embodiment of the invention, the first and second sidewalls 510 and 512 each have a single smooth outer surface with edges that merge with edges of an inner surface defined in part by the aperture 506. Similar to other embodiments of the invention, and best illustrated in FIG. 5B, the outer surfaces of the first and second sidewalls 510 and 512 may be concavely contoured in the vertical plane (i.e., plane perpendicular to the longitudinal axis 514 of the aperture 506) that bisects the first and second sidewalls 510 and 512 (see concave contours 522 in FIG. 5B). The concavely-contoured outer surfaces reduce the possibility of the outside fingers slipping up and down the outer surfaces of the sidewalls 110 and 112, compared to if the outer surfaces had a straight contour, for example In planes parallel to the longitudinal axis 514 the outer surfaces of the first and second sidewalls 510 and 512 may have a convex contour. The base 502 may also include a magnet 516 for releasably attaching the holder 500 to a receiving unit, similar to illustrated and described above in reference to FIGS. 2 and 3.

The tablet computer holders described above are designed to accommodate fingers of an average-size adult human hand. However, they can be manufactured to accommodate fingers of different sizes. For example, an "adult-sized" holder can be manufactured by sizing the aperture 106 of the holder 100 shown in FIGS. 1A-C, first and second apertures 408 and 414 of the holder 400 shown in FIGS. 4A-C, or the aperture 506 of the single-finger holder 500 in FIGS. 5A-C to accommodate and best-fit fingers of an adult and a "child-sized" holder having a smaller aperture can be manufactured for children, who typically have smaller-sized fingers. Alternatively, irrespective of age, a plurality of different-sized holders (e.g., small, medium and large) can be manufactured to receive and accommodate small, medium and large finger sizes.

Other benefits and advantages of the tablet computer holders of the present invention are that the holders are made from materials that can be sterilized and/or which do not collect dirt. This makes the holders of the present invention well-suited for environments that must be kept very clean, such as doctor's offices or semiconductor manufacturing clean rooms. Further, some prior art approaches tablet computer holders that have been proposed use straps that must either be designed to have a specific length in order to fit a particular-sized tablet or that must be designed to be adjustable in order to fit a particular-sized tablet. Such designs are large not easy to carry around. They also more complicated and cumbersome to use compared to the tablet computer holders of the present invention.

While various exemplary embodiments of the present invention have been illustrated and described in detail above, those of ordinary skill in the art will appreciate and understand that various changes in form and detail may be made without departing from the true spirit and scope of the invention. The scope of the invention should therefore not be restricted to the specifics of the exemplary embodiments described but instead determined by the words of the appended claims and the full scope of equivalents to which such claims are entitled.

What is claimed is:

1. A tablet computer holder for holding and supporting a tablet computer, comprising:
    a base having a bottom surface adapted to releasably attach to a back surface of the tablet computer or a receiving unit on the back surface of the tablet computer;
    a top portion; and
    a body having an aperture formed therethrough and first and second sidewalls that connect said top portion to said base, each of said first and second sidewalls having an inner surface and a single smooth outer surface with edges that merge with edges of said inner surface,
    wherein the outer surface of each of said first and second sidewalls has a generally convex contour in a plane that is parallel to a longitudinal axis of said aperture and has a generally concave contour in a plane that is perpendicular to said longitudinal axis and which bisects the first and second sidewalls.

2. The tablet computer holder of claim 1, wherein the cross-section of said aperture about its longitudinal axis has an elliptical or semi-elliptical shape.

3. The tablet computer holder of claim 2, wherein said body further includes a ridge that protrudes into said aperture and extends in a direction substantially parallel to the longitudinal axis of said aperture, said ridge adapted to form between two fingers inserted in said aperture.

4. The tablet computer holder of claim 1, wherein said aperture has a shape and size configured to receive and accommodate two or more fingers of an average-size adult human hand.

5. The tablet computer holder of claim 4, wherein said body further includes a ridge that protrudes into said aperture and extends in a direction substantially parallel to a longitudinal axis of said aperture, said ridge adapted to form between two fingers inserted in said aperture.

6. The tablet computer holder of claim 1, wherein said body further includes a second aperture, and said first and second apertures are spaced apart and adapted to receive and accommodate first and second fingers of a human hand.

7. A tablet computer holder for holding and supporting a tablet computer, comprising:
    a base having a bottom surface adapted to releasably attach to a back surface of the tablet computer or a receiving unit on the back surface of the tablet computer;
    a top portion; and
    a body having an aperture formed therethrough and first and second sidewalls that connect said top portion to said base, said aperture having a shape and size adapted to receive and accommodate two or more fingers of an average-size adult human hand,
    wherein each of said first and second sidewalls has an outer surface with a generally convex contour in a plane that is parallel to a longitudinal axis of said aperture, the outer surface of each of said first and second sidewalls comprises a single smooth outer surface with edges, and each of said first and second sidewalls further has an inner surface with edges that merge with the edges of its corresponding single smooth outer surface.

8. The tablet computer holder of claim 7, wherein the outer surface of each of said first and second sidewalls has a generally concave contour in a plane that is perpendicular to a longitudinal axis of said aperture and which bisects the first and second sidewalls.

9. The tablet computer holder of claim 7, wherein said body further includes a ridge that protrudes into said aperture and extends in a direction substantially parallel to a longitudinal axis of said aperture, said ridge adapted to form between two fingers inserted in said aperture.

10. The tablet computer holder of claim 7, wherein the cross-section of said aperture about its longitudinal axis has an elliptical or semi-elliptical shape.

11. The tablet computer holder of claim 10, wherein said body further includes a ridge that protrudes into said aperture and extends in a direction substantially parallel to a longitudinal axis of said aperture, said ridge adapted to form between two fingers inserted in said aperture.

12. A tablet computer holder for holding and supporting a tablet computer, comprising:
    a base having a bottom surface adapted to releasably attach to a back surface of the tablet computer or a receiving unit on the back surface of the tablet computer;
    a top portion; and
    a body connecting said base to said top portion and having first and second apertures formed therethrough, said first and second apertures spaced apart and adapted to receive first and second fingers of a human hand,
    wherein said body has first and second sidewalls each having an outer surface with a generally concave contour in a plane which bisects the first and second sidewalls and is perpendicular to first and second longitudinal axes of said first and second apertures.

13. The tablet computer holder of claim 12, wherein the outer surface of each of said first and second sidewalls comprises a single smooth outer surface with edges and each of said first and second sidewalls further has an inner surface with edges that merge with the edges of its corresponding single smooth outer surface.

14. The tablet computer holder of claim 12, wherein the outer surface of each of said first and second sidewalls has a generally convex contour in a plane that is parallel to first and second longitudinal axes of said first and second apertures.

15. A tablet computer holder for holding and supporting a tablet computer, comprising:
- a base having a bottom surface adapted to releasably attach to a back surface of the tablet computer or a receiving unit on the back surface of the tablet computer;
- a top portion; and
- a body having an aperture formed therethrough and first and second sidewalls that connect said top portion to said base, said aperture having a shape and size adapted to receive and accommodate two or more fingers of an average-size adult human hand,
- wherein each of said first and second sidewalls has an outer surface with a generally convex contour in a plane that is parallel to a longitudinal axis of said aperture and has a generally concave contour in a plane that is perpendicular to said longitudinal axis and which bisects the first and second sidewalls.

* * * * *